(12) United States Patent
Li-On et al.

(10) Patent No.: US 9,779,003 B2
(45) Date of Patent: Oct. 3, 2017

(54) SAFELY MAPPING AND UNMAPPING HOST SCSI VOLUMES

(71) Applicant: INTERNATIONAL BUSINESS MACHINES CORPORATION, Armonk, NY (US)

(72) Inventors: Oren Li-On, Ramat-Gan (IL); Orit Nissan-Messing, Hod HaSharon (IL); Assaf Nitzan, Haifa (IL); Eyal Perek, Petach Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 13/916,162

(22) Filed: Jun. 12, 2013

(65) Prior Publication Data

US 2014/0372636 A1 Dec. 18, 2014

(51) Int. Cl.
*G06F 11/30* (2006.01)
*G06F 3/06* (2006.01)

(52) U.S. Cl.
CPC .......... *G06F 11/3034* (2013.01); *G06F 3/067* (2013.01); *G06F 3/0613* (2013.01); *G06F 3/0635* (2013.01); *G06F 11/3051* (2013.01); *G06F 11/3055* (2013.01)

(58) Field of Classification Search
None
See application file for complete search history.

(56) References Cited

U.S. PATENT DOCUMENTS

| 6,209,023 | B1 | 3/2001 | Dimitroff et al. |
| 6,356,977 | B2 | 3/2002 | Ofek et al. |
| 6,400,730 | B1 | 6/2002 | Latif et al. |
| 6,405,294 | B1 | 6/2002 | Hayter |
| 6,557,048 | B1 * | 4/2003 | Keller et al. ............ 710/6 |
| 6,718,402 | B1 | 4/2004 | Arroyo |

(Continued)

FOREIGN PATENT DOCUMENTS

EP  2557494 A1  2/2013

OTHER PUBLICATIONS

Li Bigang et al., "Design and Implementation of a Storage Virtualization System Based on SCSI Target Simulator in SAN," Tsinghua Science and Technology, vol. 10, No. 1, pp. 122-127.

*Primary Examiner* — Idriss N Alrobaye
*Assistant Examiner* — Dayton Lewis-Taylor
(74) *Attorney, Agent, or Firm* — Griffiths & Seaton PLLC (57) ABSTRACT

Methods, apparatus and computer program products implement embodiments of the present invention that include detecting, by a storage system, a change in a mapping of a logical volume to one or more host ports of a host computer communicating with the storage system via a storage area network (SAN). Subsequent to detecting the change, first and second input/output (I/O) requests for the logical volume are received from a given host port, and a first unit attention message is conveyed to the given host port in response to the first I/O request. A second unit attention message is conveyed to the given host port upon determining that the storage system received the second I/O request within a specific time period commencing upon receiving the first I/O request. However, the second I/O request can be performed if the storage system received the second I/O request subsequent to the specific time period.

14 Claims, 3 Drawing Sheets

(56) References Cited

U.S. PATENT DOCUMENTS

| | | |
|---|---|---|
| 6,915,354 B1 | 7/2005 | Ozdemir et al. |
| 6,922,761 B2 | 7/2005 | O'Connell et al. |
| 6,934,799 B2 | 8/2005 | Acharya et al. |
| 6,976,103 B1 | 12/2005 | Watanabe et al. |
| 7,103,712 B2 | 9/2006 | Mizuno |
| 7,173,929 B1 | 2/2007 | Testardi |
| 7,191,304 B1 | 3/2007 | Cameron et al. |
| 7,209,981 B1 | 4/2007 | Wade et al. |
| 7,321,925 B2 | 1/2008 | Trethewey |
| 7,340,639 B1 | 3/2008 | Lee et al. |
| 7,409,442 B2 | 8/2008 | Basham et al. |
| 7,577,169 B1 * | 8/2009 | Dinh et al. .................. 370/509 |
| 7,594,024 B2 | 9/2009 | Shah et al. |
| 7,610,467 B2 | 10/2009 | Mimatsu et al. |
| 7,634,588 B2 | 12/2009 | Okada et al. |
| 7,640,408 B1 | 12/2009 | Halligan et al. |
| 7,668,981 B1 | 2/2010 | Nagineni et al. |
| 7,707,151 B1 | 4/2010 | Blumenau et al. |
| 7,757,055 B2 | 7/2010 | Tsukada et al. |
| 7,778,157 B1 | 8/2010 | Tawri et al. |
| 7,904,681 B1 | 3/2011 | Bappe et al. |
| 7,937,617 B1 | 5/2011 | Nagineni et al. |
| 8,028,110 B1 | 9/2011 | Wigmore |
| 8,060,710 B1 | 11/2011 | Don et al. |
| 8,086,896 B2 | 12/2011 | Allen et al. |
| 8,122,225 B2 | 2/2012 | Recio et al. |
| 8,160,070 B2 | 4/2012 | Dai et al. |
| 8,166,163 B2 | 4/2012 | Ma et al. |
| 8,230,187 B1 | 7/2012 | Krinke, II et al. |
| 8,254,388 B2 | 8/2012 | Kikuchi et al. |
| 8,270,420 B2 | 9/2012 | Wang et al. |
| 8,301,812 B1 | 10/2012 | Riordan et al. |
| 8,359,379 B1 | 1/2013 | Sen |
| 8,370,588 B2 | 2/2013 | Nakajima et al. |
| 8,380,852 B2 | 2/2013 | Allen et al. |
| 8,386,610 B2 | 2/2013 | Yahalom et al. |
| 8,417,895 B1 | 4/2013 | De La Iglesia |
| 8,429,446 B2 | 4/2013 | Hara et al. |
| 8,601,220 B1 | 12/2013 | Corbin et al. |
| 8,713,356 B1 | 4/2014 | Chan et al. |
| 8,819,317 B1 | 8/2014 | Li-On et al. |
| 8,904,050 B1 * | 12/2014 | Raizen .................. G06F 3/0635 710/10 |
| 2002/0071386 A1 | 6/2002 | Gronke |
| 2002/0073297 A1 * | 6/2002 | Mizuno et al. ................ 711/202 |
| 2002/0174315 A1 | 11/2002 | Yamamoto |
| 2002/0193146 A1 | 12/2002 | Wallace et al. |
| 2002/0194407 A1 | 12/2002 | Kim |
| 2003/0067890 A1 | 4/2003 | Goel et al. |
| 2003/0212785 A1 | 11/2003 | Jibbe |
| 2005/0071577 A1 | 3/2005 | Dias et al. |
| 2005/0157730 A1 | 7/2005 | Grant et al. |
| 2005/0210144 A1 | 9/2005 | Kumagai et al. |
| 2006/0291392 A1 | 12/2006 | Alicherry et al. |
| 2007/0168396 A1 | 7/2007 | Adams et al. |
| 2008/0270564 A1 | 10/2008 | Rangegowda et al. |
| 2009/0037638 A1 | 2/2009 | Izuta et al. |
| 2009/0094428 A1 | 4/2009 | Nagata et al. |
| 2009/0213736 A1 | 8/2009 | Liu et al. |
| 2009/0292834 A1 * | 11/2009 | Neemidge et al. .............. 710/19 |
| 2010/0011114 A1 | 1/2010 | Thomas et al. |
| 2010/0070722 A1 | 3/2010 | Otani et al. |
| 2010/0161843 A1 | 6/2010 | Spry |
| 2010/0185794 A1 | 7/2010 | Belyakov et al. |
| 2010/0262772 A1 | 10/2010 | Mazina |
| 2011/0004707 A1 | 1/2011 | Spry et al. |
| 2011/0179414 A1 | 7/2011 | Goggin et al. |
| 2011/0239014 A1 | 9/2011 | Karnowski |
| 2012/0137098 A1 | 5/2012 | Wang et al. |
| 2012/0188949 A1 | 7/2012 | Salkintzis et al. |
| 2012/0221790 A1 | 8/2012 | Nunez et al. |
| 2012/0278280 A1 | 11/2012 | Broido et al. |
| 2012/0278572 A1 | 11/2012 | Broido et al. |
| 2013/0007364 A1 | 1/2013 | Xiong et al. |
| 2013/0046949 A1 | 2/2013 | Colgrove et al. |
| 2013/0067163 A1 | 3/2013 | Velayudhan et al. |
| 2013/0339647 A1 | 12/2013 | Jindo et al. |

* cited by examiner

SAFELY MAPPING AND UNMAPPING HOST SCSI VOLUMES

CROSS-REFERENCE TO RELATED APPLICATIONS

This application is related to U.S. patent application Ser. No. 13/915,922 titled "Processing Input/Output Requests Using Proxy and Owner Storage Systems", Ser. No. 13/915,948 titled "Impersonating SCSI Ports through an Intermediate Proxy", Ser. No. 13/916,120 titled "Online Migration of a Logical Volume Between Storage Systems", Ser. No. 13/916,185 titled "Unit Attention Processing in Proxy and Owner Storage Systems" and Ser. No. 13/916,254 titled "Load Balancing Input/Output Operations Between Two Computers" filed on even date with the present application, and which are incorporated herein by reference.

FIELD OF THE INVENTION

The present invention relates generally to storage systems, and specifically to processing I/O requests subsequent to mapping or unmapping a host volume in a SCSI storage system.

BACKGROUND

In a storage area network (SAN), remote computer storage devices such as disk arrays can be made accessible to host computers so that the storage devices appear as if they are locally attached to the host computer's operating system. SANs may be implemented using Small Computer System Interface (SCSI) storage devices, in which SCSI protocol entities perform input/output (I/O) operations (e.g., data reads and writes) and are exposed through a unique identifier such as a logical unit number (LUN) on a path. A given LUN typically corresponds to a logical volume, and may be represented within the host computer's operating system as a device. Interaction with a LUN is initiated by a SCSI initiator port on a host computer, which can issue various I/O request types to the LUN on a target data storage device.

The description above is presented as a general overview of related art in this field and should not be construed as an admission that any of the information it contains constitutes prior art against the present patent application.

SUMMARY

There is provided, in accordance with an embodiment of the present invention a method, including detecting, by a storage system, a change in a mapping of a logical volume to one or more host ports of a host computer communicating with the storage system via a storage area network (SAN), subsequent to detecting the change, receiving, from one of the one or more host ports, a first and a second input/output (I/O) request for the logical volume, conveying a first unit attention message to the one of the one or more host ports in response to the first I/O request, and conveying a second unit attention message to the one of the one or more host ports upon determining that the storage system received the second I/O request within a specific time period commencing upon receiving the first I/O request.

There is also provided, in accordance with an embodiment of the present invention a storage facility, including a storage area network (SAN), a host computer having host ports configured on the SAN, a storage system configured on the SAN and arranged to detect a change in a mapping of a logical volume to one or more of the host ports, to receive, subsequent to detecting the change, a first and a second input/output (I/O) request for the logical volume from one of the one or more host ports, to convey a first unit attention message to the one of the one or more host ports in response to the first I/O request, and to convey a second unit attention message to the one of the one or more host ports upon determining that the storage system received the second I/O request within a specific time period commencing upon receiving the first I/O request.

There is further provided, in accordance with an embodiment of the present invention a computer program product, the computer program product including a non-transitory computer readable storage medium having computer readable program code embodied therewith, the computer readable program code including computer readable program code configured to detect a change in a mapping of a logical volume to one or more host ports of a host computer communicating with a storage system via a storage area network (SAN), computer readable program code configured to receive, subsequent to detecting the change, a first and a second input/output (I/O) request for the logical volume from one of the one or more host ports, computer readable program code configured to convey a first unit attention message to the one of the one or more host ports in response to the first I/O request, and computer readable program code configured to convey a second unit attention message to the one of the one or more host ports upon determining that the storage system received the second I/O request within a specific time period commencing upon receiving the first I/O request.

BRIEF DESCRIPTION OF THE DRAWINGS

The disclosure is herein described, by way of example only, with reference to the accompanying drawings, wherein.

DETAILED DESCRIPTION OF EMBODIMENTS

In a storage facility comprising a host computer and a Small Computer System Interface (SCSI) based storage system configured on a storage area network (SAN), the storage system can be configured to convey a unit attention message to the host computer to indicate a change in a status of the storage system. In the disclosure and in the claims, a unit attention message indicates a change in status of the storage system. For example, SCSI based storage systems can issue unit attention messages in response to logical volume mapping changes such as:

Mapping a logical volume to a host computer. To map a logical volume (also referred to herein as a host volume) to a host computer, the logical volume can be added to a list of logical volumes that are visible to the host computer.

Unmapping a logical volume from a host computer. Prior to unmapping a logical volume, the logical volume is visible to the host computer, and subsequent to unmapping the logical volume, the logical volume is no longer visible to the host computer.

In operation, storage systems typically do not coordinate mapping and unmapping logical volumes with host computers. In a SCSI based storage system, upon detecting a status change, the storage device can return a unit attention message (e.g., LUN_INVENTORY_CHANGED) indicating that there was a mapping change. In response to the unit attention message, the host computer can perform a rescan operation to detect any changing in logical volumes mapped to the host computer. This may introduce the following two problems when there are I/O requests pending for the logical volume:

If the logical volume was unmapped from the host computer, the host may receive a LUN_INVENTORY_CHANGED unit attention message in response to a first pending I/O request and a LOGICAL_UNIT_NOT_SUPPORTED unit attention message in response to the subsequent pending I/O requests (which can then propagate as errors on the host computer).

If a first logical volume is unmapped and a second logical volume is mapped on the same logical unit number (LUN), then the pending I/O requests may execute on the second logical volume instead of the first logical volume, thereby resulting in data integrity errors.

Embodiments of the present invention provide methods and mechanisms to safely map and unmap logical volumes in a SCSI based storage system. In embodiments of the present invention, upon receiving a first and a second I/O request for a logical volume whose mapping has changed, the storage system can convey a first unit attention message to the host computer in response to the first I/O request. If the second I/O request was received within a specific time period that commenced when the first I/O request was received, the storage system can convey a second unit attention message to the host computer in response to the second I/O request. However, if the second I/O request was received subsequent to the specific time period (that commenced when the first I/O request was received), then the storage system can perform the second I/O request, and convey a result of the I/O request to the host computer.

For example if the specific time period comprises ten seconds, and the second I/O request was received five seconds after the first I/O request was received, then the storage system can convey a first unit attention message in response to the first I/O request and a second unit attention message in response to the second I/O request. However, if the second I/O request was received fifteen seconds after the first I/O request was received, then the storage system can convey a unit attention message in response to the first I/O request and perform the second I/O request.

Figure 1:
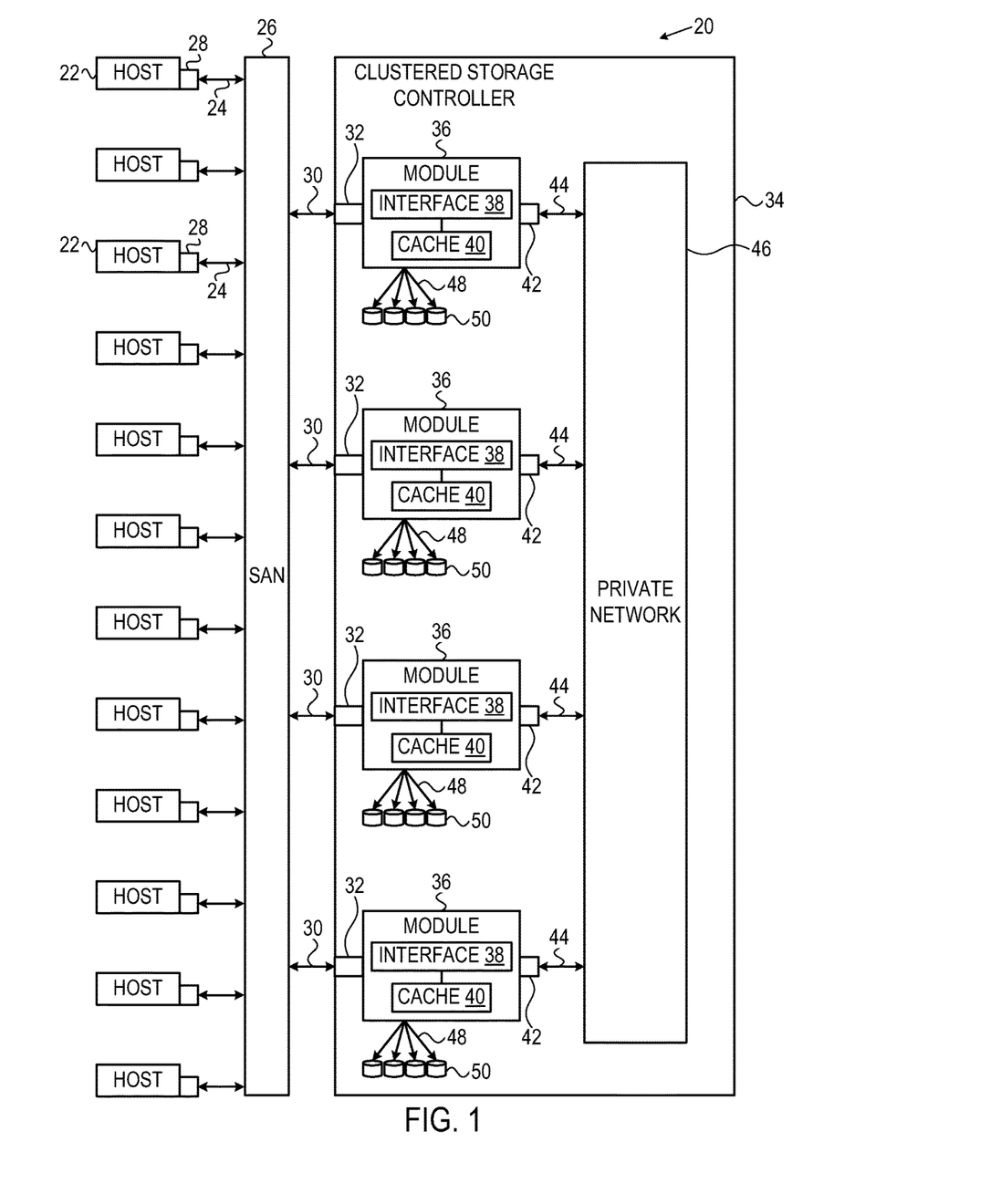
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 32 and 42 include switched fabric adapters such as Fibre Channel (FC) adapters, Internet Small Computer System Interface (iSCSI) adapters, Fibre Channel over Ethernet (FCoE) adapters and Infiniband™ adapters.

Figure 2:
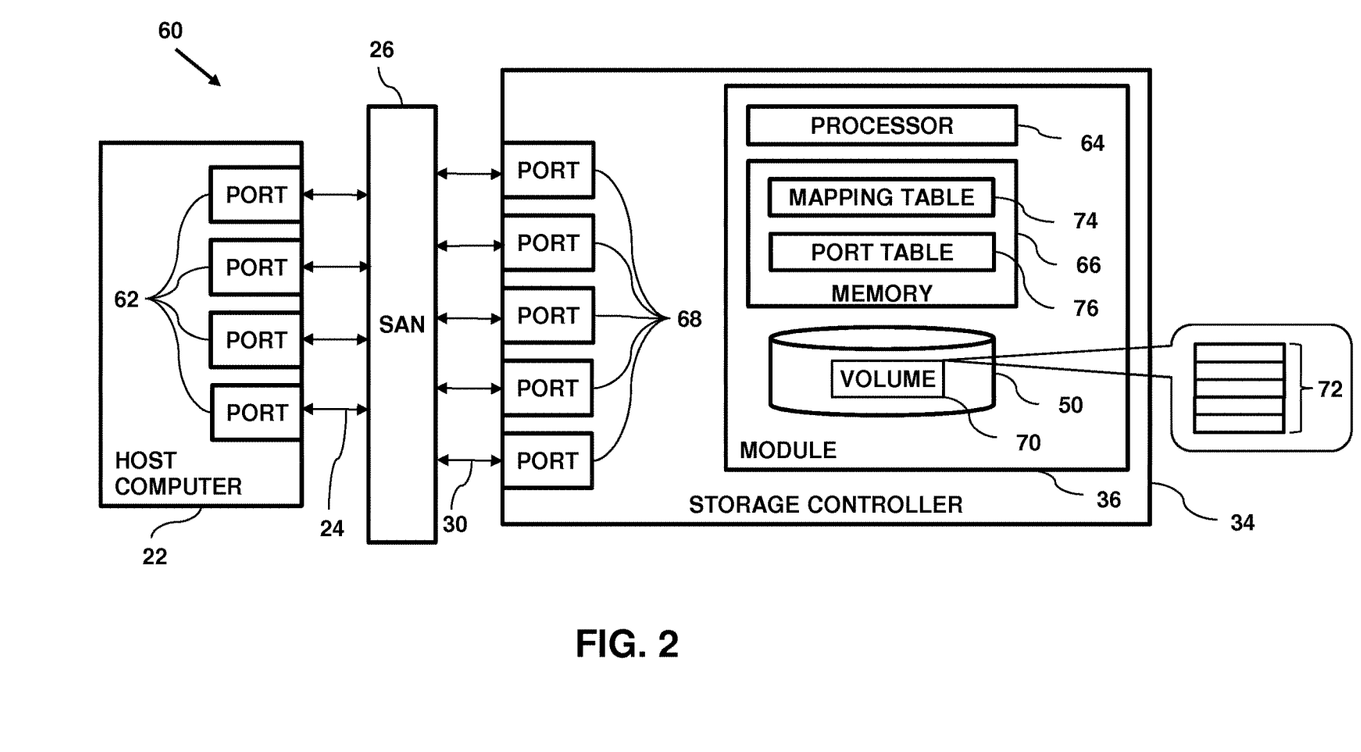
FIG. 2 is a block diagram of a storage facility configured to safely map and unmap a host volume stored on the storage system, in accordance with an embodiment of the present invention.

FIG. 2 is a block diagram of a storage facility 60 configured to safely map and unmap a logical volume 70 stored on storage controller 34, in accordance with an embodiment of the present invention. Host computer 22 communicates with SAN 26 via ports 62 (also referred to herein as host ports 62). Module 36 comprises a processor 64 and a memory 66, and communicates with SAN 26 via ports 68. In some embodiments, ports 62 and 68 may comprise SCSI ports, and the SCSI ports may be configured within module 36. In the configuration shown in FIG. 2, host computer 22 and source storage controller 34 can communicate over a given path on SAN 26 between a given host port 62 and a given port 68.

While for purposes of illustrative simplicity, the configuration in FIG. 2 shows module 36 comprising a single storage device 50 storing a single logical volume 70, module 36 typically comprises multiple storage devices 50 storing multiple logical volumes 70. Additionally, logical volume 70 may be stored across multiple storage devices 50 in a given storage controller 34.

Logical volume 70 comprises data stored in multiple regions 72. Each region (also known as a partition or a block) comprises a sequence of bytes on storage device 50 that have a specific length, typically one megabyte. In operation, volume 70 can be mapped between host computer 22 and storage controller 34, and details of the mapping can be stored in a mapping table 74.

In embodiments of the present invention, processor 64 may also maintain a port table 76 in memory 66. As explained hereinbelow, upon detecting a change to mapping table 74, processor 64 can add a new entry to port table 76, the new entry referencing a mapping of a given host port 62 to logical volume 70. Each entry in port table 76 is configured to store a time value indicating when processor 64 receives a first I/O request from the given host port subsequent to detecting the change in the mapping table.

Processor 64 typically comprises a general-purpose central processing unit (CPU), which is programmed in software to carry out the functions described herein. The software may be downloaded module 36 in electronic form, over a network, for example, or it may be provided on non-transitory tangible media, such as optical, magnetic or electronic memory media. Alternatively, some or all of the functions of processor 64 may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

I/O Request Processing

Figure 3:
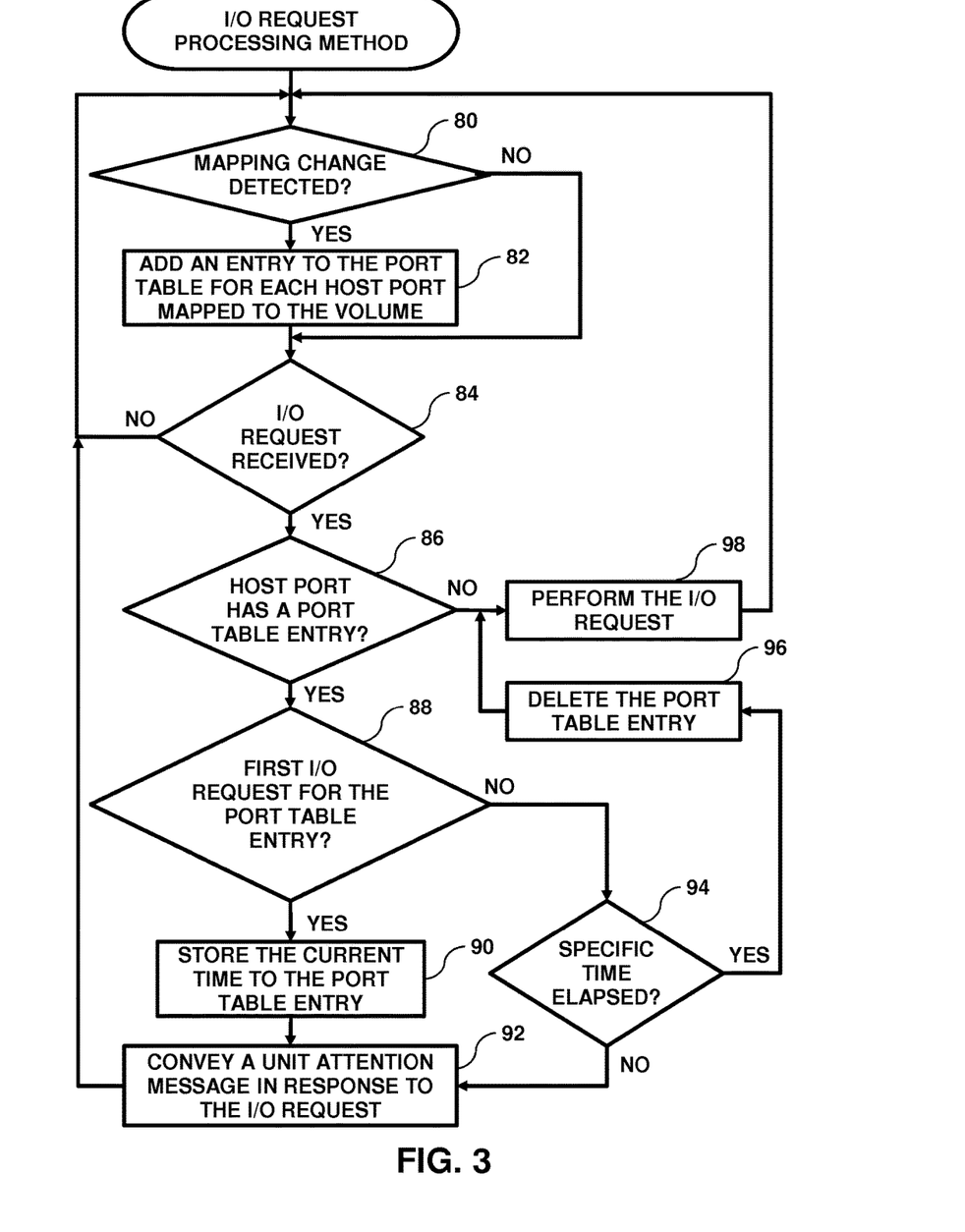
FIG. 3 is a flow diagram that schematically illustrates a method of processing input/output (I/O) requests upon detecting a change in the mapping of the host volume, in accordance with an embodiment of the present invention.

FIG. 3 is a flow diagram that schematically illustrates a method of processing I/O requests subsequent to detecting a change in mapping table 74, in accordance with an embodiment of the present invention. In a first comparison step 80, if processor 64 detects, in mapping table 74, a change in an existing mapping of logical volume 70 to one or more host ports 62, then in an entry step 82, the processor adds a separate entry to port table 76 for each of the one or more host ports 62. For example, in step 80, processor 64 may detect that logical volume 70 has been unmapped from two host ports 62, or that one of the two host ports that was previously mapped to logical volume 70 is now mapped to a different logical volume (not shown).

In a second comparison step 84, if processor 64 receives an I/O request for the logical volume from a given host port 62, then in a third comparison step 86, the processor checks if the given host port has an entry in port table 76. Example of I/O requests include, but are not limited to, a request to read data from logical volume 70 and a request to write data to the logical volume.

If processor 64 identifies an entry in port table 76 for the given host port, then in a fourth comparison step 88, the processor checks if the identified entry indicates if any I/O requests were received from the given host port subsequent to adding the entry to port table 76 (in step 82). For example, when processor 64 adds an entry in step 82, the processor can initialize the entry by storing "0" to the entry. Therefore, if the identified entry is still storing "0" in step 88, then processor 64 has not received any I/O requests from the given host port subsequent to adding the identified entry to port table 76.

If processor 64 did not receive any I/O requests for logical volume 70 from given host port between adding the identified entry to port table 76 and receiving the I/O request in step 84, then the received I/O request comprises a first I/O request, and in a store step 90, the processor stores a current time (i.e., replacing the initial value of "0" stored in the entry) to the identified entry. In a convey step 92, in response to the first I/O request, processor 64 conveys a unit attention message (e.g., LUN_INVENTORY_CHANGED) to the given host port, and the method continues with step 80.

Returning to step 88, if processor 64 detects that the received I/O request is not the first I/O request received from the given port subsequent to adding the identified entry to port table 76, then in a fifth comparison step 94, the processor determines if a specific time period has elapsed since receiving the first I/O request. In some embodiments, the specific time period can be configured by a system administrator for facility 60. Continuing the example described supra, if the identified entry stores a time value indicating a time when the first I/O request was received, upon receiving a second I/O request for volume 70 from the given host port, the processor can determine, using the stored time value and a current time value, if the specific time period (e.g., ten seconds) has elapsed.

If the specific time period has not yet elapsed, then the method continues with step 92. If the specific time period has elapsed, then processor 64 deletes the identified entry from port table 76 in a delete step 96, in a perform step 98, the processor performs the I/O request, and the method continues with step 80.

Returning to step 86, if processor 64 does not identify an entry in port table 76 for the given host port, then the method continues with step 98. Returning to step 84, if processor 64 does not receive an I/O request for logical volume 70 from a given host port 62, then the method continues with step 80. Finally, returning to step 80, if processor 64 does not detect a change in an existing mapping of logical volume 70 to one or more host ports 62, then the method continues with step 84.

The flow diagram describes a method for processing of a first and a second I/O request for volume 70 that processor 64 received from a given host port 62 subsequent to detecting a change in an existing mapping of the logical volume to the given host port. In some embodiments, there may be additional mappings between volume 70 and host computer 22. In other words the existing mapping may comprise a first mapping, the given host port may comprise a first host port 62, and mapping table 74 may store a second mapping of logical volume 70 to a second host port 62.

In SCSI based storage system, a unit attention message is typically conveyed along all paths that map host computer 22 to logical volume 70. Therefore, subsequent to detecting a change in the second mapping, processor 64 may receive, from the second of the host ports, a third and a fourth input/output (I/O) request for the logical volume. The third and fourth I/O requests comprise first and second I/O requests received for logical volume 70 from the second host port.

In response to the third I/O request, processor 64 can convey a third unit attention message to the second host port in response to the third I/O request, and convey a fourth unit attention message to the second host port in response to the fourth I/O request upon determining that the storage system received the fourth I/O request within the specific time period subsequent receiving the third I/O request. In embodiments of the present invention, processor 64 did not receive any I/O requests from the second port between detecting the change in the second mapping and receiving the third I/O request.

In SCSI based storage system, logical volume 70 is typically referenced by a serial number on a given LUN. In embodiments of the present invention, if processor 64 receives, from host computer 22, a SCSI inquiry command requesting a serial number for a given LUN associated with volume 70, then the processor will perform all I/O requests for volume 70 upon receiving the SCSI inquiry command, even if no unit attention messages have been conveyed. For example, if processor 64 detects, in mapping table 74, a change in an existing mapping of logical volume 70 to one or more host ports 62, and receives a SCSI inquiry command prior to receiving an I/O request for the logical volume from one of the one or more host ports, then the processor can process the received I/O request without sending a unit attention message.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   detecting, by a storage system, a change in a mapping of a logical volume to one or more host ports of a host computer communicating with the storage system via a storage area network (SAN);
   subsequent to detecting the change, receiving, from one of the one or more host ports, a first and a second input/output (I/O) request for the logical volume;
   conveying a first LUN_INVENTORY_CHANGED unit attention message to the one of the one or more host ports in response to the first I/O request indicating a time value for when the first I/O request was received; and
   conveying a second LUN_INVENTORY_CHANGED unit attention message to the one of the one or more host ports upon determining that the storage system received the second I/O request within a specific time period commencing upon receiving the first I/O request; wherein if the second I/O request was received after the specific time period, the second LUN_INVENTORY_CHANGED unit attention message is conveyed in response to the first I/O request in lieu of performing the first I/O request while performing the second I/O request.

2. The method according to claim 1, wherein each of the first and the second I/O requests is selected from a list comprising a request to read data from the logical volume and a request to write data to the logical volume.

3. The method according to claim 1, wherein the change to the mapping is selected from a list comprising mapping the logical volume to the one of the one or more ports and unmapping the logical volume from the one of the one or more ports.

4. The method according to claim 1, wherein the storage system did not receive any I/O requests from the one of the one or more host ports host between detecting the change and receiving the first I/O request.

5. The method according to claim 1, and comprising performing the first I/O request upon receiving a small computer system interface (SCSI) inquiry command subsequent to detecting the change and prior to receiving the first I/O request.

6. A storage facility, comprising:
   a storage area network (SAN);
   a host computer having host ports configured on the SAN;
   a storage system configured on the SAN and arranged to:
   detect a change in a mapping of a logical volume to one or more of the host ports;
   to receive, subsequent to detecting the change, a first and a second input/output (I/O) request for the logical volume from one of the one or more host ports;
   convey a first LUN_INVENTORY_CHANGED unit attention message to the one of the one or more host ports in response to the first I/O request indicating a time value for when the first I/O request was received; and
   convey a second LUN_INVENTORY_CHANGED unit attention message to the one of the one or more host ports upon determining that the storage system received the second I/O request within a specific time period commencing upon receiving the first I/O request; wherein if the second I/O request was received after the specific time period, the second LUN_INVENTORY_CHANGED unit attention message is conveyed in response to the first I/O request in lieu of performing the first I/O request while performing the second I/O request.

7. The storage facility according to claim 6, wherein each of the first and the second I/O requests is selected from a list comprising a request to read data from the logical volume and a request to write data to the logical volume.

8. The storage facility according to claim 6, wherein the change to the mapping is selected from a list comprising mapping the logical volume to the one of the one or more ports and unmapping the logical volume from the one of the one or more ports.

9. The storage facility according to claim 6, wherein the storage system did not receive any I/O requests from the one of the one or more host ports host between detecting the change and receiving the first I/O request.

10. The storage facility according to claim 6, wherein the storage system is configured to perform the first I/O request upon receiving a small computer system interface (SCSI) inquiry command subsequent to detecting the change and prior to receiving the first I/O request.

11. A computer program product, the computer program product comprising:
   a non-transitory computer readable storage medium having computer readable program code embodied therewith, the computer readable program code comprising:
   computer readable program code configured to detect a change in a mapping of a logical volume to one or more host ports of a host computer communicating with a storage system via a storage area network (SAN);
   computer readable program code configured to receive, subsequent to detecting the change, a first and a second input/output (I/O) request for the logical volume from one of the one or more host ports;
   computer readable program code configured to convey a first LUN_INVENTORY_CHANGED unit attention message to the one of the one or more host ports in response to the first I/O request indicating a time value for when the first I/O request was received; and
   computer readable program code configured to convey a second LUN_INVENTORY_CHANGED unit attention message to the one of the one or more host ports upon determining that the storage system received the second I/O request within a specific time period commencing upon receiving the first I/O request; wherein if the second I/O request was received after the specific time period, the second LUN_INVENTORY_CHANGED unit attention message is conveyed in response to the first I/O request in lieu of performing the first I/O request while performing the second I/O request.

12. The computer program product according to claim 11, wherein each of the first and the second I/O requests is selected from a list comprising a request to read data from the logical volume and a request to write data to the logical volume.

13. The computer program product according to claim 11, wherein the change to the mapping is selected from a list comprising mapping the logical volume to the one of the one or more ports and unmapping the logical volume from the one of the one or more ports.

14. The computer program product according to claim 11, wherein the storage system did not receive any I/O requests from the one of the one or more host ports host between detecting the change and receiving the first I/O request.

* * * * *